United States Patent
Kaihara et al.

(10) Patent No.: US 9,156,461 B2
(45) Date of Patent: Oct. 13, 2015

(54) VEHICLE CONTROL UNIT

(71) Applicant: MITSUBISHI JIDOSHA KOGYO KABUSHIKI KAISHA, Tokyo (JP)

(72) Inventors: Kuniaki Kaihara, Toyota (JP); Hiroyuki Sakai, Kariya (JP); Atsushi Kodama, Okazaki (JP); Ryosuke Yabuta, Okazaki (JP); Yuya Suzuki, Nagoya (JP); Shohei Kawano, Okazaki (JP)

(73) Assignee: MITSUBISHI JIDOSHA KOGYO KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/291,326

(22) Filed: May 30, 2014

(65) Prior Publication Data

US 2014/0358345 A1    Dec. 4, 2014

(30) Foreign Application Priority Data

May 31, 2013 (JP) .................................. 2013-116411

(51) Int. Cl.
*B60W 20/00* (2006.01)
*B60W 10/02* (2006.01)
(Continued)

(52) U.S. Cl.
CPC .................. *B60W 10/02* (2013.01); *B60K 6/48* (2013.01); *B60L 11/1868* (2013.01); *B60W 10/06* (2013.01); *B60W 10/08* (2013.01); *B60W 10/26* (2013.01); *B60W 20/10* (2013.01); *B60W 20/40* (2013.01); *Y02T 10/52* (2013.01); *Y02T 10/6286* (2013.01); *Y10S 903/93* (2013.01)

(58) Field of Classification Search
CPC ..... B60W 10/02; B60W 10/06; B60W 10/08; B60W 10/26; B60W 20/40; Y10S 903/93

USPC .......................................................... 701/22
See application file for complete search history.

(56) References Cited

U.S. PATENT DOCUMENTS

2002/0014872 A1    2/2002  Morimoto et al.
2002/0033059 A1    3/2002  Pels et al.
(Continued)

FOREIGN PATENT DOCUMENTS

DE        10133695  A1    3/2002
DE     102011110979 A1    2/2003
(Continued)

OTHER PUBLICATIONS

Extended European Search Report mailed May 22, 2015 in corresponding European Patent Application No. 14170357.9.

*Primary Examiner* — Mary Cheung
*Assistant Examiner* — Anne Mazzara
(74) *Attorney, Agent, or Firm* — Birch, Stewart, Kolasch & Birch, LLP

(57) ABSTRACT

A control unit for a vehicle, which comprises an engine, a driving motor, an engaging/disengaging device, and a voltage raising device, includes a switching control unit and a voltage raising control unit controlling the voltage raising device. The switching control unit switches between a first driving mode in which the vehicle is driven by a driving force of the driving motor with the engaging/disengaging device released and a second driving mode in which the vehicle is driven by the driving force of the engine with the engaging/disengaging device engaged. In a case where a driving mode is switched from the first driving mode to the second driving mode, the switching control unit starts an engagement of the engaging/disengaging device and switches the driving mode to the second driving mode, after the voltage raising control unit starts the voltage raising control in the first driving mode.

5 Claims, 4 Drawing Sheets

(51) Int. Cl.
   *B60W 10/26* (2006.01)
   *B60W 10/06* (2006.01)
   *B60W 10/08* (2006.01)
   *B60K 6/48* (2007.10)
   *B60L 11/18* (2006.01)

(56) References Cited

U.S. PATENT DOCUMENTS

2005/0101432 A1 5/2005 Pels et al.
2007/0205735 A1 9/2007 Kiuchi et al.
2013/0261865 A1* 10/2013 Toki ............................... 701/22

FOREIGN PATENT DOCUMENTS

| DE | 102008000629 A1 | | 9/2009 |
| FR | 2928792 A1 | | 9/2009 |
| JP | 2007-168551 A | | 7/2007 |
| KR | 2013-0056911 | * | 5/2013 |
| WO | WO 2009112105 A2 | | 9/2009 |
| WO | WO 2009115719 A2 | | 9/2009 |
| WO | WO 2013023747 A1 | | 2/2013 |

* cited by examiner

VEHICLE CONTROL UNIT

BACKGROUND

The present invention relates to a vehicle control unit.

Hybrid vehicles, designed to obtain driving power from a combination of an engine and a motor, have been developed heretofore, and efforts are still made progressively to put better hybrid vehicles in practical use. In some of these hybrid vehicles, the driving mode is switched among an EV mode in which drive wheels are driven by using only the motor as a drive source, a series mode in which the motor is used as the drive source while the engine is used as a supply source (a generator) of electric power for the motor and a parallel mode in which both the motor and the engine are used as the power source according to the driving conditions. For example, normally, the vehicle is driven in the EV mode for urban driving, while in the event that more torque is required as in the case of acceleration in highway driving, the driving mode is switched to the parallel mode. This can suppress the fuel consumption remarkably.

As such hybrid vehicles in which the driving mode is switched in the way described above, there is known a hybrid vehicle which has a first motor generator, a second motor generator and a clutch which engages or disengages the transmission of power between the first motor generator and the second motor generator and in which the first motor generator, the second motor generator and the clutch make up a mode shift control device in which when the driving mode is shifted from the series mode to the parallel mode, the first motor generator is controlled to synchronize its rotational speed with the rotational speed of the second motor generator for engagement of the clutch (for example, refer to Patent Document 1).

[Patent Document 1] JP-A-2007-168551 (claim 1 and the like)

SUMMARY

According to an advantageous aspect of the invention, there is provided a control unit for a vehicle, comprising:

a switching control unit configured to switch a driving mode of the vehicle including a first driving mode in which the vehicle is driven by a driving force of a driving motor with an engaging/disengaging device released and a second driving mode in which the vehicle is driven by the driving force of an internal combustion engine with the engaging/disengaging device engaged, the engaging/disengaging device being configured to engage or disengage a transmission of the driving force transmitted from the internal combustion engine to drive wheels of the vehicle; and a voltage raising control unit configured to control a voltage raising device which is configured to execute a voltage raising control in which a voltage of an electric power inputted from a battery is raised for output to the driving motor, wherein in a case where the switching control unit switches the driving mode from the first driving mode to the second driving mode, the switching control unit starts an engagement of the engaging/disengaging device and switches the driving mode to the second driving mode, after the voltage raising control unit starts the voltage raising control in the first driving mode.

The voltage raising control unit may stop the voltage raising control after the engagement of the engaging/disengaging device is completed.

The control unit may further comprise a required torque calculation device configured to calculate a required torque that is required on the vehicle, and may be configured such that: when the required torque becomes equal to or larger than a predetermined value, the switching control unit starts the engagement of the engaging/disengaging device after the voltage raising control unit starts the voltage raising control by the voltage raising device; and the switching control unit keeps the engaging/disengaging device engaged even though the required torque decreases below the predetermined value during the engagement of the engaging/disengaging device.

According to another advantageous aspect of the invention, there is provide a control unit for a vehicle, comprising:

a switching control unit configured to switch a driving mode of the vehicle which includes a first driving mode in which the vehicle is driven by a driving force of a driving motor with an engaging/disengaging device released and a second driving mode in which the vehicle is driven by a driving force of an internal combustion engine with the engaging/disengaging device engaged, the engaging/disengaging device being configured to engage or disengage a transmission of the driving force transmitted from the internal combustion engine to drive wheels of the vehicle; and a voltage raising control unit configured to control a voltage raising device which is configured to execute a voltage raising control in which a voltage of an electric power inputted from a battery is raised for output to the driving motor, wherein in the first driving mode, the voltage raising control unit starts the voltage raising control by the voltage raising device to charge a storage battery device which is configured to store the electric power of which the voltage is raised by the voltage raising device, and when the switching control unit switches the driving mode from the first driving mode to the second driving mode, the switching control unit starts an engagement of the engaging/disengaging device and switches the driving mode to the second driving mode, after a switching device, which is configured to connect or disconnect a connection circuit connecting the storage battery device with the driving motor, connects the storage battery device with the driving motor.

DETAILED DESCRIPTION OF EXEMPLIFIED EMBODIMENTS

In Patent Document 1 cited above, when the driving mode is shifted from the series mode to the parallel mode in the configuration described above, it may be possible to achieve a smooth acceleration without involving deterioration in clutch durability. However, it is considered that the following problem is caused when the driving mode is shifted from the EV mode to the parallel mode as a result of high torque being required.

Namely, when the driving mode is shifted from the EV mode to the parallel mode, although not only the driving force of the motor but also the driving force from the engine is required to deal with the required torque, only the motor is driven during a shift period from the EV mode to the parallel mode. Because of this, the torque given is not sufficient in this shift period, and a problem is considered that the torque required by the driver cannot be outputted smoothly (for example, in accelerating the vehicle, the driver cannot accelerate the vehicle smoothly as desired). The shift of the driving mode like this is not limited to the shift from the EV mode to the parallel mode.

According to a vehicle control unit of the invention, it is possible to output torque smoothly by suppressing the reduction in torque even while the driving mode is being shifted.

Figure 1:
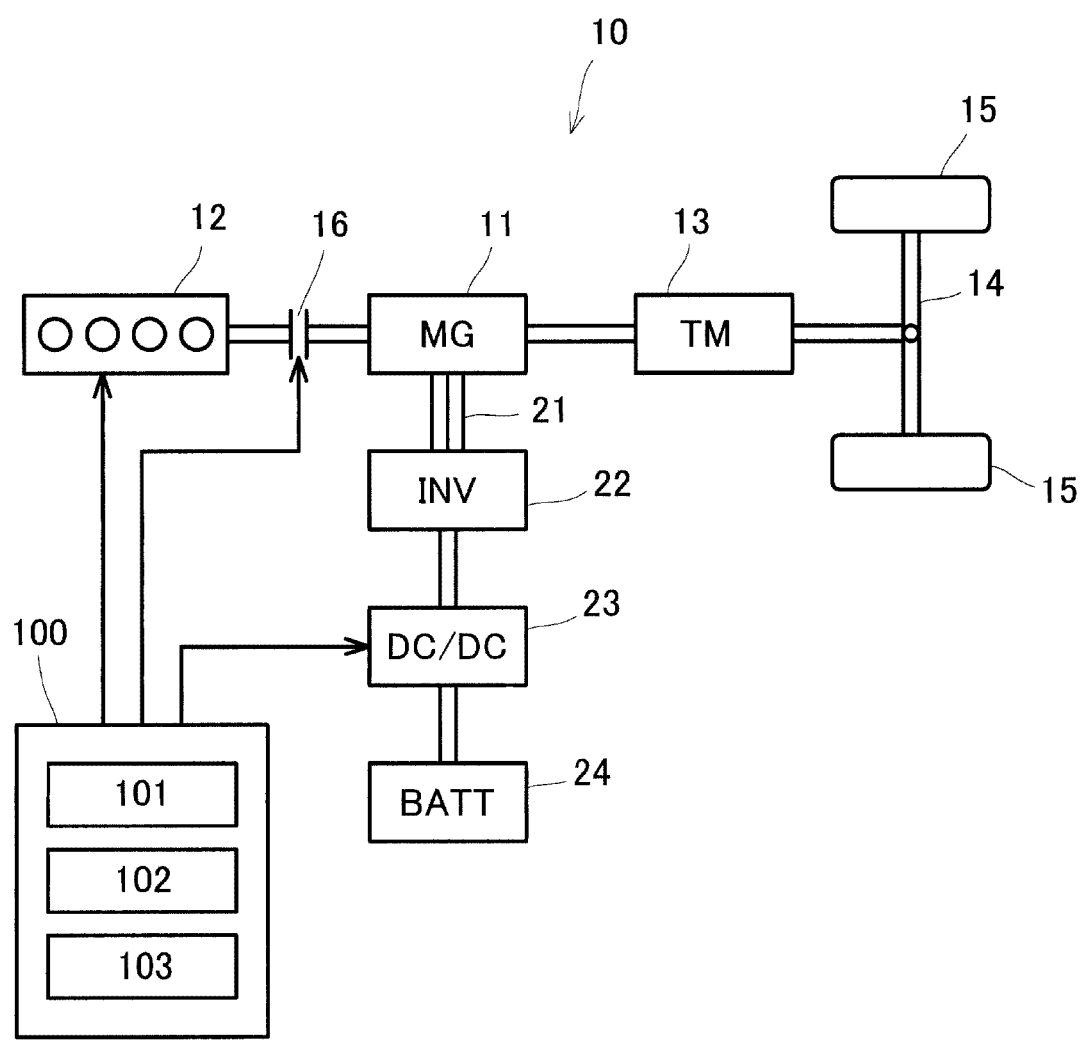
FIG. 1 is a block diagram showing the configuration of a vehicle according to an embodiment of the invention.

As shown in FIG. 1, a hybrid vehicle (hereinafter, also referred to simply as a "vehicle") 10 according to this embodiment includes a driving motor 11 and an engine (an internal combustion engine) 12 as a drive source for driving the vehicle. The driving motor 11 functions as a motor which operates by receiving electric power from a battery 24 to impart a driving force to the vehicle 10, as well as a generator when regeneration is executed. The driving force of the driving motor 11 is transmitted to wheels 15 by way of a transmission 13 and axle shafts 14.

The engine 12 is configured as a general internal combustion engine and is driven by combustion of fuel which is supplied from a fuel tank, not shown. A clutch (an engaging/disengaging device) 16 is provided between the driving motor 11 and the engine 12 to engage or disengage the transmission of the driving force from the engine 12.

The driving motor 11 is connected to an inverter 22 via a three-phase wire 21. The battery 24 is connected to the inverter 22 by way of a DC-DC converter (a voltage raising device) 23. A predetermined electric power is supplied from the battery 24 to the driving motor 11 by way of the DC-DC converter 23 and the inverter 22 in response to the operation of an accelerator pedal by the driver. In this embodiment, as will be described in detail later, the voltage which is supplied to the electric motor 11 by the DC-DC converter 23 in response to the operation of the accelerator pedal by the driver is raised temporarily, whereby the output of the driving motor 11 is increased temporarily.

The vehicle 10 includes a control unit 100 which executes a consolidated control of the vehicle. The control unit 100 will be described as below.

The control unit 100 includes a torque detection unit 101 which detects a stroke position of the accelerator pedal operated by the driver to detect required torque from the accelerator pedal stroke position so detected. The control unit 100 acquires the accelerator pedal stroke position which is outputted by an accelerator pedal stroke position sensor (not shown) which is provided on the accelerator pedal.

Additionally, the control unit 100 includes a switching unit 102 and a voltage raising control unit 103. The switching unit 102 executes a predetermined control to switch the driving mode of the vehicle according to the required torque detected in the torque detection unit 101. The voltage raising control unit 103 executes a control of the raising of voltage by the DC-DC converter 23 according the required torque.

The switching control unit 102 switches the driving mode of the vehicle 10 between an EV mode (a first driving mode) in which the wheels 15 are driven by using only the driving motor 11 as a power source and a parallel mode (a second driving mode) in which the wheels 15 are driven by using both the engine 12 and the driving motor 11 as the power source according to the required torque detected in the torque detection unit 101. The switching control unit 102 determines based on whether or not the required torque detected is equal to or larger than a predetermined value whether the driving mode of the vehicle should be switched to the EV mode or to the parallel mode. In the event that the driving mode of the vehicle 10 is different from the driving mode determined by the switching control unit 102, the switching control unit 102 switches the driving mode of the vehicle to the driving mode determined thereby.

Specifically, the switching control unit 102 determines that the driving mode of the vehicle should be the EV mode in the event that the required torque is smaller than the predetermined value and starts a disengagement control whereby the clutch 16 is released, stopping the engine 12. Consequently, when the vehicle is in the EV mode, the clutch 16 is disengaged (released), and the driving motor 11 is operated by electric power supplied from the battery 24, and the driving force of the driving motor 11 is transmitted to the axle shafts 14 and then to the wheels 15 by way of the transmission 13.

On the other hand, in the event that the required torque is equal to or larger than the predetermined value, determining that the driving mode of the vehicle should be the parallel mode (which is an engine driving mode), the switching control unit 102 starts a control to engage the clutch 16 and activates the engine 12. Consequently, when the vehicle is in the parallel mode, the clutch 16 is engaged, and the driving force of the engine 12 is also transmitted to the wheels 15 by way of the transmission 13 and the axle shafts 14.

Incidentally, with the driving mode of the vehicle being the EV mode, when the switching control unit 102 determines that the driving mode of the vehicle should be shifted to the parallel mode as a result of the required torque being equal to or larger than the predetermined value, the switching control unit 102 starts the engine 12 and initiates the control to engage the clutch 16. As this occurs, there is generated a time lag until the engine 12 is activated and the clutch 16 is engaged, that is, before the driving mode is shifted completely to the parallel mode.

In this embodiment, in the time lag (the shift period) from the start of the engine 12 to the engagement of the clutch 16, as will be described below, the voltage raising control unit 103 executes a control to raise the voltage inputted into the driving motor 11 by the DC-DC converter 23, so that the driving motor 11 can obtain a large output temporarily. Originally, the driving forces of the engine 12 and the driving motor 11 are required to meet the required force even during this shift period. In this embodiment, torque equal to the required torque is outputted by an enhanced driving force of the driving motor 11 which receives the raised voltage. This will be described in detail as below.

When the required torque detected becomes equal to or lager than the predetermined value, the voltage raising control unit 103 controls the DC-DC converter 23 so as to raise the voltage that is inputted into the driving motor 11. Specifically, the voltage of electric power that is inputted into the DC-DC converter 23 from the battery is raised for output (a voltage raising control). The electric power outputted is then inputted into the driving motor 11. The voltage raising control unit 103, having determined that the engagement of the clutch 16 is completed, stops raising the voltage. Whether or not the engagement of the clutch 16 is completed is determined based on a determination of whether or not both clutch plates have the same rotational speed by detecting rotational speeds of both the clutch plates.

The driving motor 11 can obtain a large output as a result of the voltage raised by the voltage raising control unit 103 being applied thereto. This will be described in detail by reference to FIG. 2.

Figure 2:
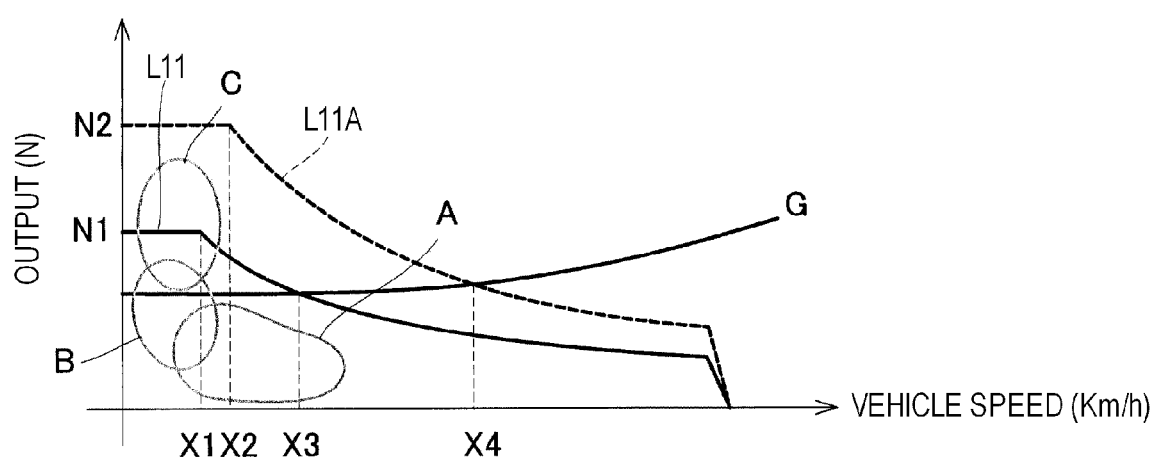
FIG. 2 is a graph which explains the output of a driving motor.

FIG. 2 shows an output of the driving motor 11 with respect to vehicle speed. A solid line L11 denotes an output of one second rating (a momentary rating) of the driving motor 11. A broken line L11A denotes an output of one second rating of a driving motor which has the same performance as that of the driving motor 11 when the raised voltage is supplied thereto. Namely, when the raised voltage is supplied thereto, the driving motor 11 of this embodiment outputs a driving force equal to the driving force of the driving motor 11A which is indicated by the broken line L11A.

As shown in FIG. 2, a maximum output of the driving motor 11 is N1, and the output of the driving motor 11 remains constant until the vehicle speed reaches X1. Thereafter, the output decreases as the vehicle speed increases. Additionally, a maximum output of the driving motor 11A having the same performance as that of the driving motor 11 which results when the raised voltage is supplied thereto is N2, which is larger than N1. The output of the driving motor 11A remains constant until the vehicle speed reaches X2, whereafter the output decreases as the vehicle speed increases. The output of the driving motor 11A having the same performance as that of the driving motor 11 which results when the raised voltage is supplied thereto is larger than that of the driving motor 11 over the whole vehicle speed regions.

Consequently, since the driving motor 11 can output the driving force of the driving motor 11A which is indicated by the broken line L11A as a result of the voltage to be supplied thereto being raised, the output of the driving motor 11 is increased largely. This can suppress the reduction in torque during the shift period where the driving mode is shifted from the EV mode to the parallel mode even though the driving force is transmitted only by the driving motor 11.

Should there be no voltage raising in the input voltage to the driving motor 11 as in the embodiment, when the driving mode is shifted from the EV mode to the parallel mode, originally, there exists only the output indicated by the solid line L11 in FIG. 2 as the driving force during the shift period where the driving forces of the driving motor and the engine are required, and therefore, the resultant output torque becomes lower than the high required torque, which is not preferable.

Additionally, as shown in FIG. 2, a normal-use region A which is used much in a normal driving overlaps a high efficiency region B of the driving motor 11, and therefore, the output can be obtained with good efficiency during the normal use of the driving motor. In contrast with this, a high efficiency region of the driving motor 11A whose output is higher becomes a region C. Then, should the higher-output driving motor 11A be used as the driving motor, the normal-use region A which is used much in the normal driving does not overlap the high efficiency region C of the higher-output driving motor 11A, and this deteriorates the efficiency, which is not preferable. Consequently, as in this embodiment, it is possible to obtain the efficient output in the normal driving by adopting the configuration in which the output of the driving motor 11 is enhanced temporarily by raising the voltage supplied to the driving motor 11.

In addition, by adopting the configuration described above, the vehicle speed range where the EV driving is possible is extended, and therefore, the fuel economy of the vehicle can be made better. A curve G in FIG. 2 denotes outputs required to obtain a predetermined acceleration at each vehicle speed. With the driving motor 11, when the drive requires acceleration, the required acceleration can be dealt with by the EV mode to a vehicle speed X3 where the curve G intersects the output of the driving motor 11. Consequently, with the driving motor 11 to which the raised voltage is supplied, the vehicle can be driven in the EV mode to a vehicle speed X4 where the curve G intersects the output of the driving motor 11A which is equal to the output of the driving motor to which the raised voltage is supplied.

Namely, with no voltage raising device provided, in the vehicle, it is necessary that the engine 12 is started and the clutch 16 is engaged in a vehicle speed equal to or faster than the vehicle speed X3. However, according to this embodiment, the DC-DC converter 23 is provided so as to raise the input voltage to the driving motor 11, and therefore, in the vehicle, it is not necessary that the engine 12 is started and the clutch 16 is engaged until the vehicle speed X4 is reached. In this way, according to the embodiment, by adopting the configuration in which the input voltage to the driving motor 11 is raised by the DC-DC converter 23, the vehicle speed range where the vehicle can be driven only in the EV mode is extended.

By adopting the configuration in which the input voltage to the driving motor 11 is raised by the DC-DC converter 23 temporarily to thereby extend the vehicle speed range where the vehicle can be driven only in the EV mode, the amount of energy that can be acquired during regeneration is also increased.

Figure 3:
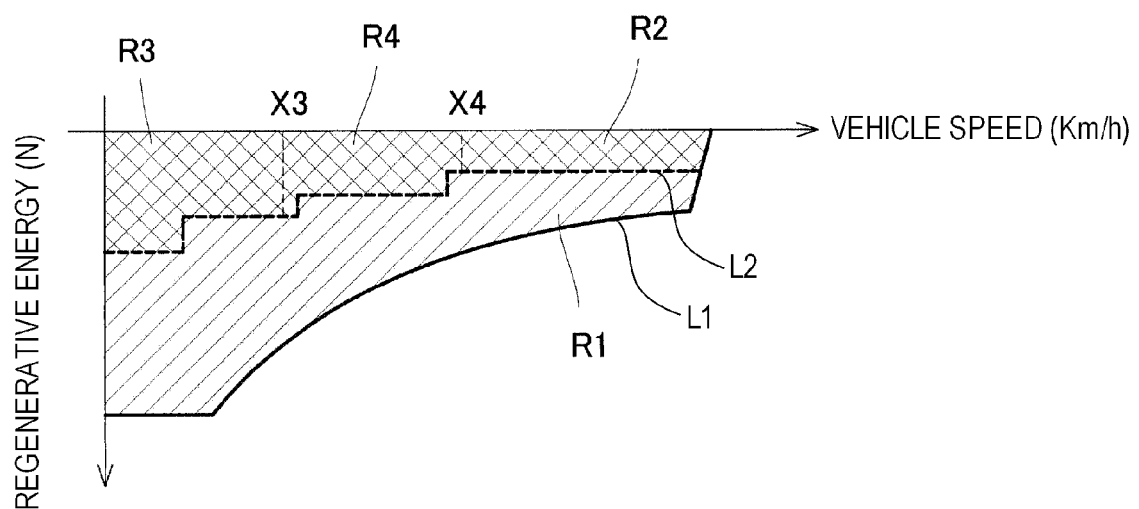
FIG. 3 is a graph which explains a regeneration occurring in the driving motor.

FIG. 3 shows regenerative energy with respect to vehicle speed while the driving motor 11 operates in a regenerative mode. A solid line L1 denotes energy regenerated by the driving motor 11 with respect to vehicle speed. An area R1 (indicated by slant lines in the figure) surrounded by this solid line L, an axis of abscissas and an axis of ordinates denotes regenerated energy which is obtained through regeneration executed by the driving motor 11.

A broken line L2 denotes energy that is consumed by engine brake during regeneration. During regeneration, with the clutch 16 engaged, energy is consumed in the engine 12 by such an extent that engine brake is applied or that friction is produced by constituent components of the engine 12, whereby the energy so consumed cannot be inputted into the battery 24 as regenerated energy. Consequently, with the clutch 16 engaged during regeneration, an amount of energy existing in an area R2 (shaded with both slant lines in the figure) which is surrounded by the broken line L2, the axis of abscissas and the axis of ordinates is deducted from the energy existing in the area R1 defined by the solid line L1 which denotes the energy regenerated by the driving motor 11.

However, as explained by reference to FIG. 2, with the vehicle having no voltage raising device and configured to be driven only the driving motor 11, the clutch 16 is not engaged until the vehicle speed reaches the vehicle speed X3. Consequently, with the vehicle having no voltage raising device and configured to be driven only the driving motor 11, the clutch is not engaged until the vehicle speed X3 is reached, and no regenerated energy is consumed in the engine. Therefore, in the area R2 which is defined by the broken line L2, of the energy consumed by engine brake, regenerated energy in a range R3 which ranges from a vehicle speed of 0 to the vehicle speed X3 can be obtained.

Here, in this embodiment, since the configuration is adopted in which the voltage supplied to the driving motor 11 can be raised, as explained by reference to FIG. 2, the vehicle speed range where the vehicle can be driven only in the EV mode is from the vehicle speed 0 to the vehicle speed X4, and the clutch 16 is not engaged until the vehicle speed X4 is reached. Consequently, according to this embodiment, in the area R2 which is defined by the broken line L2, of the energy consumed by engine brake, the regenerated energy in the range from the vehicle speed 0 to the vehicle speed X4 can be obtained.

Namely, in this embodiment, compared with the case where no voltage raising device is provided, since the vehicle speed range where the vehicle can be driven only in the EV mode is extended, in the area R2 which is defined by the broken line L2, regenerated energy can also be obtained in a range from the vehicle speed X3 to the vehicle speed X4. Consequently, by providing the voltage raising device and executing the control of this embodiment, a good efficiency can also be obtained during regeneration.

In this way, in this embodiment, by providing the DC-DC converter 23 while driving the driving motor 11 in the regions where good efficiency is obtained in the normal driving, the voltage supplied to the driving motor 11 is raised to thereby increase the output of the driving motor 11, whereby it is possible to suppress the reduction in torque when the driving mode of the vehicle is shifted from the EV mode to the parallel mode. Additionally, the vehicle speed range where the vehicle can be driven only in the EV mode can be extended to thereby improve the fuel economy, and the efficient regeneration is achieved also during regeneration.

In the embodiment, while the voltage raising control unit 103 stops raising the voltage when it determines that the clutch 16 is completely engaged, the invention is not limited thereto. Raising voltage that is supplied to the driving motor may be stopped any time on and after the clutch 16 is completely engaged. In addition, while the clutch 16 is provided between the driving motor 11 and the engine 12, the invention is not limited thereto, and hence, the clutch 16 may be provided in any position as long as the clutch 16 can engage or disengage the transmission of the driving force from the engine 12.

Additionally, the required torque becomes less than the predetermined value during the voltage raising control by the voltage raising control unit 103, the switching control unit 102 continues the engagement of the clutch 16 without disengaging the clutch 16 and keeps the engine 12 running. When the engagement of the clutch 16 is completed, the voltage raising control unit 103 stops raising the voltage, and the driving mode of the vehicle is shifted to the parallel mode. When the required torque remains less than the predetermined value since a predetermined length of time has elapsed, the switching control unit 102 stops the operation of the engine 12 and release the engagement of the clutch 16. By adopting this configuration, it is possible to allow the vehicle to be driven in a more preferable fashion.

The hybrid vehicle may be configured according to another embodiment which will be described below by reference to FIG. 4.

Figure 4:
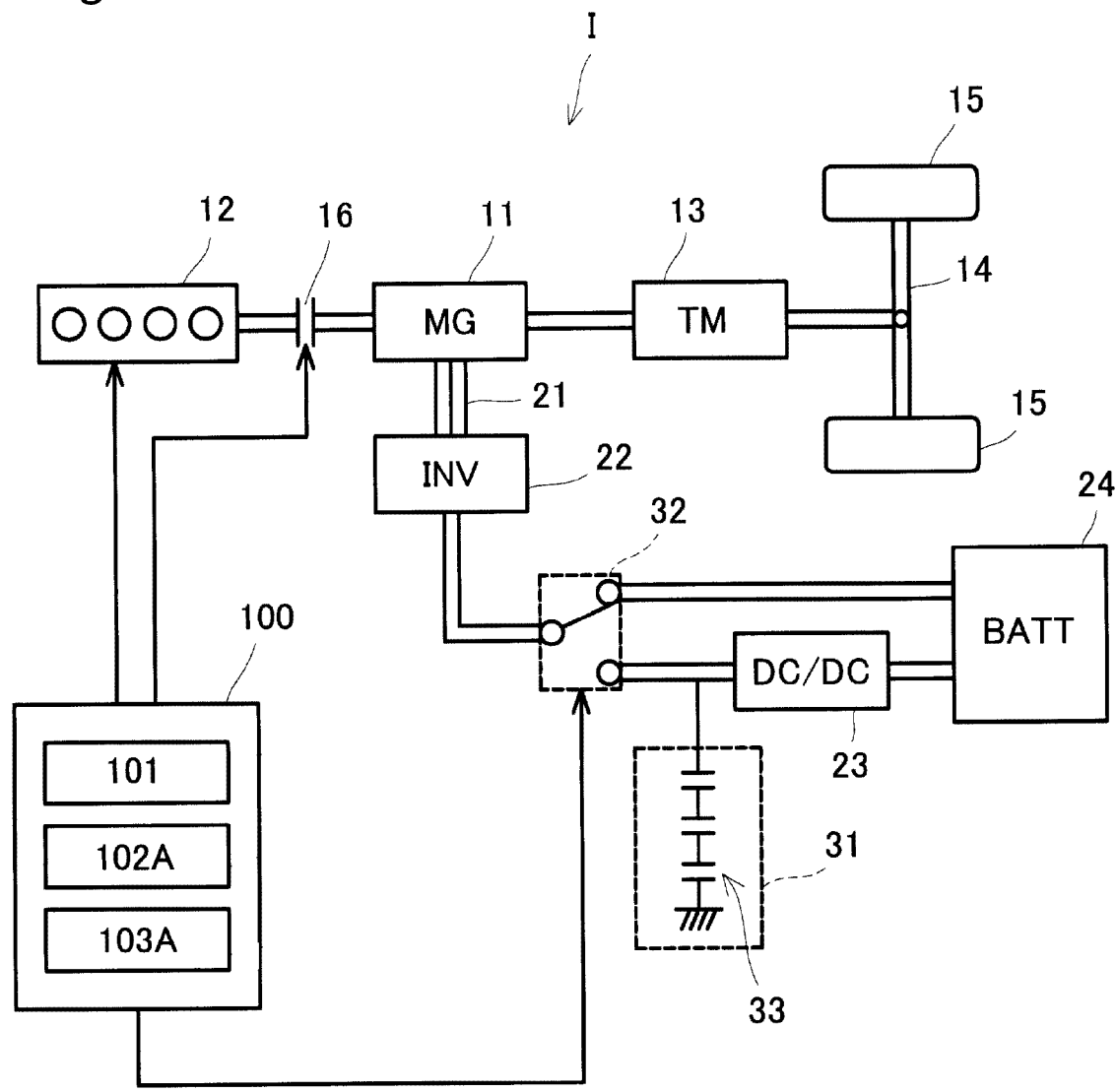
FIG. 4 is a block diagram which shows the configuration of a vehicle according to another embodiment of the invention.

In an embodiment shown in FIG. 4, a vehicle I has a charging unit (a battery device) 31 and a switching unit 32. The switching unit 32 is designed to execute a switching operation between a battery 24 and an inverter 22 (a first connection side) and between a DC-DC converter 23 and the inverter 22 (a second connection side). The charging unit 31 is provided between the second connection side and the DC-DC converter 23. In this embodiment, while the charging unit 31 is made up of three capacitors 33 which are connected in series, the invention is not limited thereto.

A control unit 100 includes a switching control unit 102A which switches the driving mode of the vehicle according to required torque that is detected in a torque detection unit 101 and a voltage raising control unit 103A which controls the voltage raising executed by the DC-DC converter 23.

In this embodiment, the switching unit 32 is connected to the first connection side when the vehicle is driven in an EV mode. Then, a voltage that is supplied to a driving motor 11 is raised in the DC-DC converter 23 by the voltage raising control unit 103A, and electric charges are stored in the charging unit 31. Then, when the driving mode is shifted from the EV mode to a parallel mode, the switching control unit 102A switches an electrical communication from the first connection side to the second connection side in the switching unit 32, whereafter the engagement of the clutch 16 is started. This switches the driving mode of the vehicle to the parallel mode.

In this way, in this embodiment, the voltage raising control is started in the EV mode, and the resultant electric charges are stored in the charging unit 31. Then, in switching the driving mode of the vehicle from the EV mode to the parallel mode, the switching unit 32 is connected, and thereafter, the engagement of the clutch 16 is started for switching to the parallel mode. By adopting this configuration, as with the embodiment that has been described first, the voltage that is supplied to the driving motor can be raised to increase the output of the driving motor when the modes are switched, whereby the reduction in torque can be suppressed which would otherwise be caused when the driving mode is switched from the EV mode to the parallel mode. In this embodiment, while the charging unit 31 is made up of the capacitors 33, the invention is not limited thereto. Hence, a secondary battery or a rechargeable battery which can store electric charges may be used to make up the charging unit 31.

In the respective embodiments, the time lag has been described which occurs when the driving mode of the vehicle is shifted from the EV mode to the parallel mode, the invention is not limited thereto. The same control can be executed when a shift is made from the series mode to the parallel mode. In addition, in the embodiments, while the parallel mode is described as the mode in which the engine and the battery are used as the drive source, the parallel mode includes a mode in which the vehicle is driven by using the engine as the drive source or the vehicle is driven by using mainly the engine as the drive source with the driving motor assisting the engine in driving the vehicle. In the embodiments, the parallel mode in which both the engine and the motor are used as the drive source is described as being used as the second driving mode, the second driving mode may be a mode in which only the engine makes up the drive source. The invention can, of course, be applied even to a hybrid vehicle which has no series mode as a driving mode.

Thus, according the vehicle control unit of the invention, a superior advantage can be provided in which the torque never becomes insufficient even during the shift period of the driving modes.

According to the vehicle control unit of the invention, the reduction in torque in shifting the driving mode from one to another can be suppressed. Consequently, the invention can be made use of in the industrial field of manufacturing vehicles.

What is claimed is:

1. A control unit for a vehicle, comprising:
a switching controller that switches a driving mode of the vehicle including a first driving mode in which the vehicle is driven by a driving force of a driving motor with an engaging/disengaging device released and a second driving mode in which the vehicle is driven by the driving force of an internal combustion engine with the engaging/disengaging device engaged, the engaging/disengaging device being configured to engage or disengage a transmission of the driving force transmitted from the internal combustion engine to drive wheels of the vehicle; and
a voltage raising controller that controls a voltage raising device which is configured to execute a voltage raising control in which a voltage of an electric power inputted from a battery is raised for output to the driving motor, wherein in a case where the switching controller switches the driving mode from the first driving mode to the second driving mode, the switching controller starts an engagement of the engaging/disengaging device and switches the driving mode to the second driving mode, after the voltage raising controller starts the voltage raising control in the first driving mode.

2. The control unit according to claim 1, wherein
the voltage raising controller stops the voltage raising control after the engagement of the engaging/disengaging device is completed.

3. The control unit according to claim 2, further comprising:
a required torque calculator that calculates a required torque that is required on the vehicle, wherein
when the required torque becomes equal to or larger than a predetermined value, the switching controller starts the engagement of the engaging/disengaging device after the voltage raising controller starts the voltage raising control by the voltage raising device, and
the switching controller keeps the engaging/disengaging device engaged even though the required torque decreases below the predetermined value during the engagement of the engaging/disengaging device.

4. The control unit according to claim 1, further comprising:
a required torque calculator that calculates a required torque that is required on the vehicle, wherein
when the required torque becomes equal to or larger than a predetermined value, the switching controller starts the engagement of the engaging/disengaging device after the voltage raising controller starts the voltage raising control by the voltage raising device, and
the switching controller keeps the engaging/disengaging device engaged even though the required torque decreases below the predetermined value during the engagement of the engaging/disengaging device.

5. A control unit for a vehicle, comprising:
a switching controller that switches a driving mode of the vehicle which includes a first driving mode in which the vehicle is driven by a driving force of a driving motor with an engaging/disengaging device released and a second driving mode in which the vehicle is driven by a driving force of an internal combustion engine with the engaging/disengaging device engaged, the engaging/disengaging device being configured to engage or disengage a transmission of the driving force transmitted from the internal combustion engine to drive wheels of the vehicle; and
a voltage raising controller that controls a voltage raising device which is configured to execute a voltage raising control in which a voltage of an electric power inputted from a battery is raised for output to the driving motor, wherein
in the first driving mode, the voltage raising controller starts the voltage raising control by the voltage raising device to charge a storage battery device which is configured to store the electric power of which the voltage is raised by the voltage raising device, and
when the switching controller switches the driving mode from the first driving mode to the second driving mode, the switching controller starts an engagement of the engaging/disengaging device and switches the driving mode to the second driving mode, after a switching device, which is configured to connect or disconnect a connection circuit connecting the storage battery device with the driving motor, connects the storage battery device with the driving motor.

* * * * *